May 19, 1931.  P. CHAPMAN  1,805,612
POWER TRANSMISSION CONSTRUCTION
Filed Jan. 23, 1931
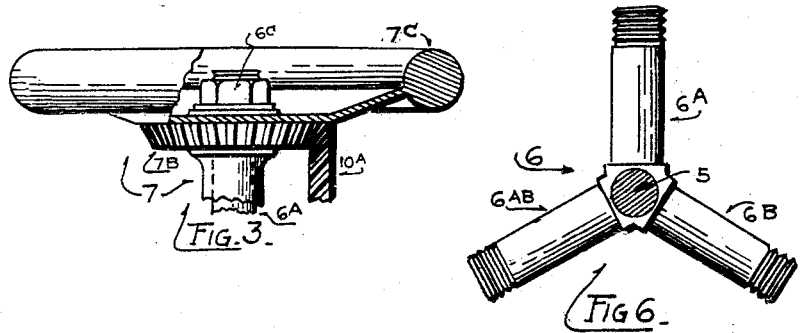
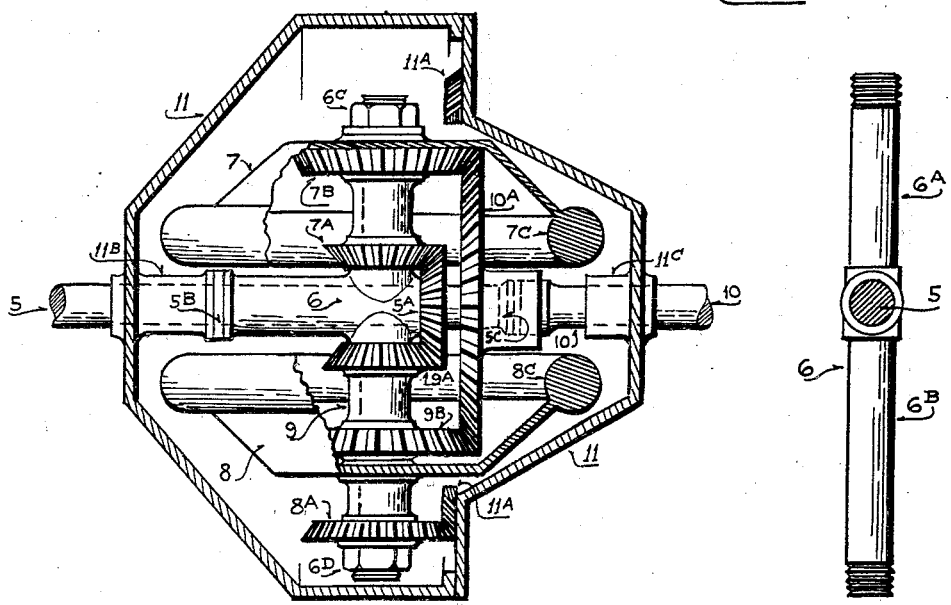
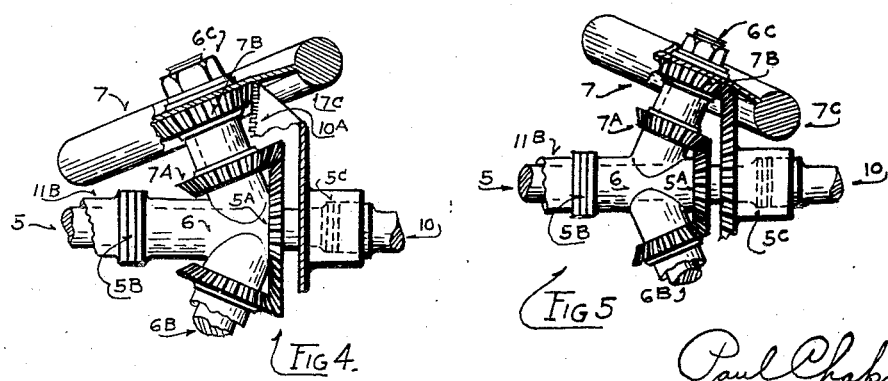
Paul Chapman
INVENTOR.

Patented May 19, 1931

1,805,612

UNITED STATES PATENT OFFICE

PAUL CHAPMAN, OF BAYSIDE, NEW YORK

POWER TRANSMISSION CONSTRUCTION

Application filed January 23, 1931. Serial No. 510,727.

This invention in power transmission construction provides a means of automatically transmitting power from a driving shaft to a driven shaft at a variable ratio of speed.

Referring to the accompanying drawings, Fig. 1 is a part elevational part cutaway sectional drawing of the variable speed transmission.

Fig. 2 is an elevational view of the body of the independent rotor 6 which is also shown in Fig. 1.

Fig. 3 is a part sectional part elevational view showing an alternate construction of the gyrator 7 shown in Fig. 1.

Fig. 4 and Fig. 5 show alternate constructions of the rotor and gyrators shown in Fig. 1.

Fig. 6 shows an alternate construction of the rotor 6, being an alternate of Fig. 3.

Referring to Figs. 1 and 2, a cylindrical revolving shaft 5 delivers power to, and a cylindrical revolving shaft 10 transmits power away from the transmission, or vice-versa. Mounted upon and at times rotating about the shaft 5, is a rotor 6 which has protruding cylindrical arms $6^a$ and $6^b$ upon which at times revolve the gyrators 7 and 8 respectively; and the independent gear rotor 9 also at times revolves about the cylindrical arm $6^b$. Fixed to the shaft 5 near its end is a bevel gear $5^a$ which transmits the torque from the shaft 5 to the bevel gear $7^a$ of the gyrator 7 and the bevel gear $9^a$ of the independent gear rotor 9. The torque is again transmitted from the bevel gear $7^b$ of the gyrator 7, and the bevel gear $9^b$ of the independent gear rotor 9, to the bevel gear $10^a$ fixed to the shaft 10.

When at times the rotor 6 rotates about the shaft 5 a bevel gear $8^a$ of the gyrator 8 in mesh with a bevel gear ring $11^a$ of the fixed support 11, causes the gyrator 8 to revolve about the cylindrical arm $6^b$ of the rotor 6.

The revolving shafts 5 and 10 revolve in the bearings $11^b$ and $11^c$ of the fixed support 11. The shaft 5 has a raised cylindrical portion with a thrust bearing $5^b$ to receive the thrust of the rotor 6, and a raised portion and thrust bearing $5^c$ at its end, to receive the thrust of the bevel gear $10^a$.

The rotor 6 has threaded nuts and thrust bearings $6^c$ and $6^d$ to receive the thrust from the bevel gears and resist the centrifugal forces of the gyrators 7 and 8, and the independent rotor 9.

The gyrators 7 and 8 are provided with circular rings $7^c$ and $8^c$ respectively, of suitable weight.

A torque applied to the shaft 5 causes the rotor 6 to rotate about it and also the gyrators 7 and 8 to revolve about the rotor 6, the two motions transferring a torque to the shaft 10.

Since by construction the proportion of the perimeters of the bevel gears $5^a$ and $7^a$ is not equal to the proportion of the perimeters of the bevel gears $10^a$ and $7^b$ it is apparent that an unbalanced force exists which causes the rotation of the rotor 6 which rotation in turn causes revolution of the gyrators 7 and 8.

This revolution of the gyrators 7 and 8 with their rotation around the shaft 5 along with the rotor 6, furnishes the resistance to the said unbalanced force, which resistance is dependent both on the speed of revolution of the gyrators 7 and 8 and of the rotation of the rotor 6.

It follows then that the speed as well as the torque of the shaft 5 affects the rotation of the rotor 6 and consequently the speed and torque of shaft 10, and the ratio of speed change between them is consequently in a variable ratio.

It is well known that the resistance of a revolving body to a change of its plane of rotation is due not only to its mass but also to its speed of revolution, and it is upon this fact that the resistance of the gyrators 7 and 8 is based.

If the centers of revolution of the gyrators 7 (and the independent gyrators 8 if used) lay upon the axis of the shaft 5, the ratio of speeds of the shafts 5 and 10 would be somewhere between unity and the proportion indicated by the bevel gear ratios; but because the centers do not lay on that axis, a definite free rotation of the gyrators 7 (gyroscopic precession) exists for every speed of their revolution dependent on the distance of the centers from the axis of the shaft 5. This free rotation removes the aforementioned limitation of the ratio of speed of driving shaft 5 and the driven shaft 10.

Fig. 3 shows an alternate construction with the plane of the gyrator weights 7$^c$ further removed from the axis of the drive shaft 5 than shown in Fig. 1.

Fig. 4 and Fig. 5 show alternate constructions of the rotor 6 with the protruding cylindrical arms 6$^a$ and 6$^b$ not perpendicular to the axis of the shaft 5.

Fig. 6 shows the rotor 6 having an additional projecting cylindrical arm 6$^{ab}$ as an alternate construction.

It is apparent that the rotor 6 may have one or more projecting arms of the nature shown, that more or less gyrators of the type 7 or independent gyrators of the type 8 may be used, and that this construction may be used with the power applied thru the shaft 10 and taken away thru the shaft 5 or vice-versa, without affecting the principles of this invention.

I claim:—

1. In power transmission construction, a fixed supporting casing, a driving shaft extending into one end of said casing, a driven shaft extending into the opposite end of said casing coaxially with said driving shaft, a rotor freely mounted coaxially on said driving shaft for rotation thereabout, cylindrical arms on said rotor projecting radially therefrom, one or more gyrators mounted coaxially on said cylindrical arms for revolution thereabout, a bevel gear fixedly mounted on said driving shaft beyond said rotor, bevel gears fixedly mounted on said gyrators in mesh with said bevel gear on said driving shaft to revolve said gyrators around said cylindrical arms, bevel gears fixedly mounted on said gyrators in mesh with a bevel gear fixedly mounted on the said driven shaft, suitable weights of ring form fixedly mounted coaxially on said gyrators for revolution therewith, a bevel gear fixedly mounted on the said driven shaft in mesh with said bevel gears on said gyrators to transmit power delivered by said driving shaft to said driven shaft.

2. In power transmission construction, a fixed supporting casing, a driving shaft extending into one end of said casing, a driven shaft extendng into the opposite end of said casing coaxially with said driving shaft, a rotor freely mounted coaxially on said driving shaft for rotation thereabout, cylindrical arms on said rotor projecting radially therefrom, one or more independent gear rotors mounted coaxially on said cylindrical arms for revolution thereabout, a bevel gear fixedly mounted on said driving shaft beyond said freely mounted rotor, bevel gears fixedly mounted on said independent gear rotors in mesh with said bevel gear on said driving shaft to revolve said independent gear rotors about said cylindrical arms, bevel gears fixedly mounted on said independent gear rotors in mesh with a bevel gear fixedly mounted on said driven shaft, a bevel gear fixedly mounted on said driven shaft in mesh with bevel gears on said independent rotors to transmit power delivered by said driving shaft to said driven shaft, independent gyrators also freely mounted coaxially on said cylindrical arms for revolution thereabout, bevel gears fixedly mounted on said independent gyrators in mesh with a bevel ring gear fixedly mounted on said fixed supporting casing, a bevel ring gear fixedly mounted on said supporting casing coaxially with said driven shaft in mesh with said bevel gears on said independent gyrators, suitable weights of ring form fixedly mounted coaxially on said independent gyrators for revolution therewith.

3. In power transmission construction, a fixed supporting casing, a driving shaft extending into one end of said casing, a driven shaft extending into the opposite end of said casing coaxially with said driving shaft, a rotor freely mounted coaxially on said driving shaft for rotation thereabout, cylindrical arms on said rotor projecting radially therefrom, a bevel gear fixedly mounted on said driving shaft beyond said rotor, gyrators mounted coaxially on said cylindrical arms for revolution thereabout, bevel gears fixedly mounted on said gyrators in mesh with said bevel gear on said driving shaft to revolve said gyrators around said cylindrical arms, bevel gears fixedly mounted on said gyrators in mesh with a bevel gear fixedly mounted on the said driven shaft, suitable weights of ring form fixedly mounted coaxially on said gyrators for revolution therewith, independent gear rotors mounted coaxially on said cylindrical arms for revolution thereabout, bevel gears fixedly mounted on said independent gear rotors in mesh with said bevel gear on said driving shaft to revolve said independent gear rotors about said cylindrical arms, bevel gears fixedly mounted on said independent gear rotors in mesh with said bevel gear fixedly mounted on said driven shaft, independent gyrators also freely mounted coaxially on said cylindrical arms for revolution thereabout, bevel gears fixedly mounted on said independent gyrators in mesh with a bevel ring gear fixedly mounted on said fixed supporting casing, a bevel ring gear fixedly mounted on said supporting casing coaxially with said driven shaft in mesh with said bevel gears on said independent gyrators, suitable weights of ring form fixedly mounted coaxially on said independent gyrators for revolution therewith, a bevel gear fixedly mounted on the said driven shaft in mesh with said bevel gears on said gyrators and also in mesh with said bevel gears on said independent rotors to transmit power delivered by said driving shaft to said driven shaft.

4. In power transmission construction, a driven shaft extending through one end of a fixed supporting casing, a bevel gear fixedly attached to said driven shaft near the end of said driven shaft, a rotor with cylindrical arms projecting radially, a bevel gear fixedly attached to a driving shaft, a driving shaft extending consecutively through said fixed supporting casing through said rotor through said bevel gear fixedly attached and into means of holding said driving shaft in alignment coaxially and longitudinally with said driven shaft, gyrators with coaxially fixedly attached ring weights and fixedly attached bevel gears in mesh with said bevel gear on said driving shaft and fixedly attached bevel gears in mesh with said bevel gear on said driven shaft, means to produce like hand revoluble movement of said driven shaft at a rate of speed inversely proportional to the torque of said driven shaft for any revoluble speed and torque of said driving shaft by the deflection of said gyrators from their planes of revolution as they rotate along with said rotor substantially as described.

5. In power transmission construction, a driven shaft extending through one end of a fixed supporting casing, a bevel gear fixedly attached to said driven shaft near the end of said driven shaft, a rotor with cylindrical arms projecting radially, a bevel gear fixedly attached to a driving shaft, a driving shaft extending consecutively through said fixed supporting casing through said rotor through said bevel gear fixedly attached and into means of holding said driving shaft in alignment coaxially and longitudinally with said driven shaft, independent gear rotors mounted coaxially on said cylindrical arms for revolution thereabout, bevel gears fixedly attached to said independent gear rotors in mesh with said bevel gear on said driving shaft, bevel gears fixedly attached to said independent rotors in mesh with said bevel gear on said driven shaft, independent gyrators with suitable ring weights fixedly attached, bevel gears fixedly attached to said independent gyrators in mesh with a ring gear rigidly attached to said fixed supporting casing, means to produce like hand revoluble movement of said driven shaft at a rate of speed inversely proportional to the torque of said driven shaft for any revoluble speed of said shaft by the deflection of said independent gyrators from their planes of revolution as they rotate along with said rotor substantially as described.

6. In power transmission construction, a fixed supporting casing, a driving shaft extending thru one end of said casing, a driven shaft extending thru the opposite end of said casing, a rotor freely mounted on said driving shaft for rotation thereabout, cylindrical arms on said rotor projecting radially therefrom, gyrators coaxially mounted on said arms for revolution thereabout, a bevel gear fixedly attached to said driving shaft in mesh with bevel gears fixedly attached to said gyrators, a bevel gear fixedly attached to said driven shaft in mesh with bevel gears fixedly attached to said gyrators, suitable weights fixedly attached to said gyrators for revolution therewith about a center removed from the axis of said driving shaft, gyrators revolving about centers not laying on the axis of rotation or the axis of said driving shaft, means to obtain a variable ratio of speed of said driving shaft to said driven shaft substantially as shown.

7. In power transmission construction, a fixed supporting casing, a driven shaft extending thru one end of said casing, a driving shaft extending thru the opposite end of said casing, a rotor freely mounted on said driven shaft for rotation thereabout, cylindrical arms on said rotor projecting radially therefrom, one or more gyrators coaxially mounted on said arms for revolution thereabout, a bevel gear fixedly attached to said driven shaft in mesh with bevel gears fixedly attached to said gyrators, a bevel gear fixedly attached to said driving shaft in mesh with bevel gears attached to said gyrators, suitable weights fixedly attached to said gyrators for revolution therewith about a center removed from the axis of said driven shaft, gyrators revolving about centers not laying on the axis of rotation or the axis of said driven shaft, means to obtain a variable ratio of speed of said driven shaft to said driving shaft substantially as shown.

Signed at 1482 Broadway, New York city, in the county of New York and State of New York, this fifth day of January, A. D. 1931.

PAUL CHAPMAN.